United States Patent [19]

Okumura et al.

[11] Patent Number: 5,359,672
[45] Date of Patent: Oct. 25, 1994

[54] LINE DETECTING METHOD USING TWO RECTANGULAR WINDOWS PASSING THROUGH THE LINE TO BE DETECTED

[75] Inventors: Shinji Okumura; Seigo Nishikawa; Tatsumi Nakazato; Kiyoshi Hirakawa, all of Kitakyushi, Japan

[73] Assignee: Kabushiki Kaisha Yaskawa Denki, Kitakyushu, Japan

[21] Appl. No.: 828,960

[22] PCT Filed: Jun. 10, 1991

[86] PCT No.: PCT/JP91/00777
§ 371 Date: Feb. 4, 1992
§ 102(e) Date: Feb. 4, 1992

[87] PCT Pub. No.: WO91/20049
PCT Pub. Date: Dec. 26, 1991

[30] Foreign Application Priority Data

Jun. 13, 1990 [JP] Japan ................................. 2-155922

[51] Int. Cl.⁵ ............................................. G06K 9/66
[52] U.S. Cl. ............................................ 382/18; 382/22; 382/24
[58] Field of Search ........................ 382/18, 21, 22, 24, 382/25, 46

[56] References Cited

U.S. PATENT DOCUMENTS 5,073,954 12/1991 Van Tyne et al. ..................... 382/18
5,228,095 7/1993 Abe ........................................ 382/9

FOREIGN PATENT DOCUMENTS 1-168855 11/1989 Japan ........................... G01N 23/18
4-330584 11/1992 Japan ................................... 382/18

*Primary Examiner*—David K. Moore
*Assistant Examiner*—Andrew W. Johns
*Attorney, Agent, or Firm*—Jordan and Hamburg

[57] ABSTRACT

In the preparatory stage, among all possible lines in two rectangular windows (12) and (14), assuming dust, a flaw or the like to be a part of a line, the most valid one is recognized as a line, and the inclination and characteristic values of the line are obtained, and then each rectangular window is deformed into a parallelogram-shaped window along this inclination. In the detecting stage, the inclination and characteristic values of the line to be detected are obtained by use of the parallelogram-shaped windows. Thus, even if image data is inferior, the detection of a line is possible, so that it is possible to detect a weld line, an edge of an object of detection, etc. with high accuracy.

2 Claims, 5 Drawing Sheets

$\sum_{k=1}^{n} D_k \quad \sum_{k=1}^{n} D_k$

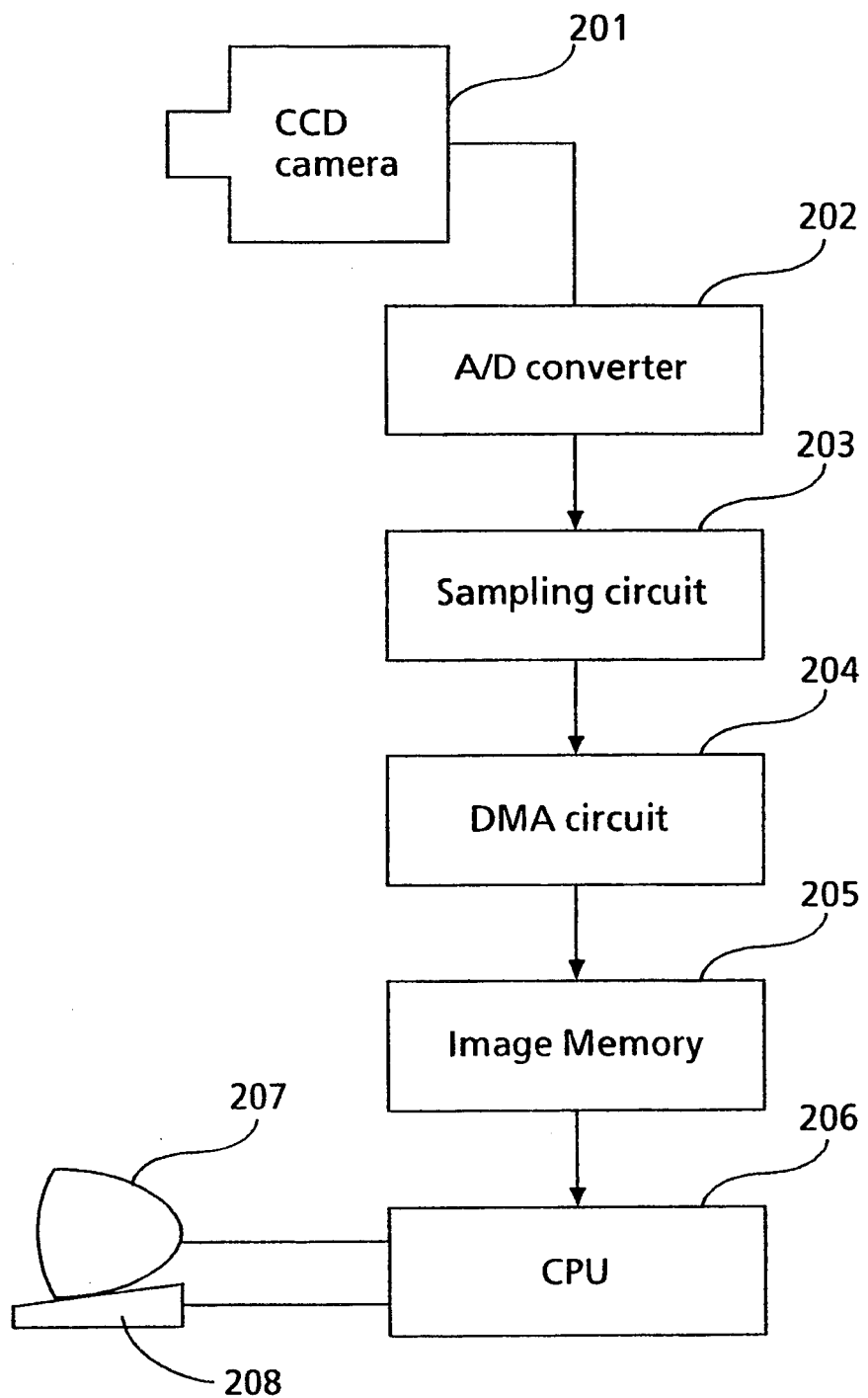

LINE DETECTING METHOD USING TWO RECTANGULAR WINDOWS PASSING THROUGH THE LINE TO BE DETECTED

FIELD OF ART

The present invention relates to a line detecting method for use in image processing to detect the position of a rectilinear object, for example, a weld line or an edge of an object. More particularly, the present invention relates to a method which enables detection with high accuracy even in a case where the input image is not constant because of inferior surroundings or in a case where the object of detection is stained.

BACKGROUND OF THE INVENTION

As a known method of detecting a line by use of an image processing method, as described above, there is a method wherein an image is converted to binary form and a position that changes from black to white or from white to black is detected. Another method is known wherein differentiation is performed by use of a matrix of pixels arranged in 3 rows and 3 columns.

The method wherein a line or an edge is detected by converting the image to binary form requires that the ambient brightness and the work condition be fixed, since the binary image changes with a change in the ambient brightness.

The method that employs a 3×3 matrix is affected by a local change of the brightness and hence cannot provide a clear image, so that, if the brightness of the image changes gently, points where the brightness changes, that is, the periphery of the image, cannot be found. In addition, if the image has a stain or the like adjacent a rectilinear line to be detected, there is a strong possibility of inviting an erroneous detection. In addition, since a large number of arithmetic operations are required, the processing speed is low.

Accordingly, these methods can be applied in a case where the input image is constant and clear, but not in inferior surroundings such as those in which an articulated industrial robot performs an operation, for example, welding.

In view of the above-described problems, it is an object of the present invention to provide a method of detecting a line or an edge as an object of detection with high reliability even in an operation performed in surroundings where conditions are not constant and the work is extremely stained.

SUMMARY OF THE INVENTION

The present invention provides a method of detecting the position of a rectilinear object of detection from an image taken into an image processing apparatus by an imaging device, wherein a preparatory stage that comprises the steps (a) to (g) is first executed as follows:

(a) setting two parallel rectangular windows that cross a line to be detected at their long sides;

(b) adding image density values in each of the pixel rows in the direction of the short sides of the rectangular windows to obtain one-dimensional data comprising a row of the resulting added values for each rectangular window;

(c) obtaining at least one feature point for each of the one-dimensional data, which has a characteristic value based on the size, gradient, change in gradient, etc., of the one-dimensional data;

(d) combining the characteristic values at the feature points in one of the one-dimensional data with the characteristic values at the feature points in the other one-dimensional data, and obtaining a combination that has the maximum value as the sum of the characteristic values;

(e) storing in memory the inclination of a line connecting the two feature points that show the maximum value, together with the value of the sum;

(f) inclining each of the rectangular windows so that the short sides thereof are parallel to the line connecting the feature points, thereby forming a parallelogram-shaped window; and (g) executing the steps (b) to (e) in regard to the parallelogram-shaped windows, thereby storing the inclination and the value of the sum.

To effect actual detection, the following step (h) is executed:

(h) executing the steps (b) to (e) again in regard to the parallelogram-shaped windows obtained in the preparatory stage, and comparing the inclination and the value of the sum, thus, obtained, with those obtained in the preparatory stage, thereby detecting the position of the line to be detected.

According to the present invention, in the preparatory stage, among all possible lines in two rectangular windows, assuming dust, a flaw or the like to be a part of a line, the most valid one is recognized as a line, and the inclination and characteristic values of the line are obtained, and then each rectangular window is deformed into a parallelogram-shaped window along this inclination.

In the detecting stage, the inclination and characteristic values of the line to be detected are obtained by use of the parallelogram-shaped windows. Thus, even if image data is inferior, it is possible to effect a detection which is adequately fit for practical use.

BRIEF DESCRIPTION OF THE DRAWING

FIG. 2 shows an apparatus required to carry out the present invention;

DESCRIPTION OF THE PREFERRED EMBODIMENT

A block diagram of an apparatus required to carry out the present invention is shown in FIG. 2.

An analog video signal that is formed by a CCD camera 201 consists of 525 scanning lines, in general. In the embodiment of the present invention, however, 481 scanning lines in the middle portion of the picture frame are defined as effective scanning lines because noise is likely to be superposed on the peripheral edge portion of the picture frame.

Figure 3:
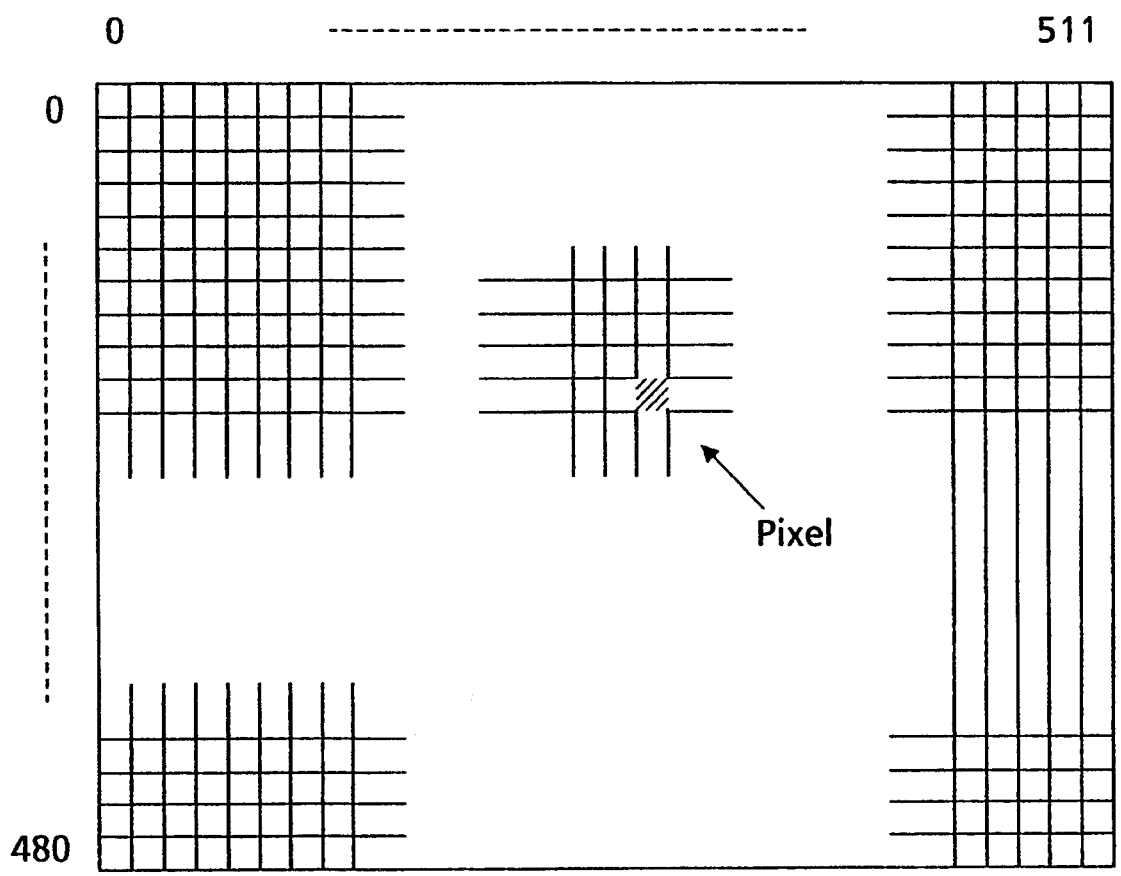
FIG. 3 shows pixels in one picture frame in the present invention.

An A/D converter 202 converts the analog video signal into 8-bit digital values (brightness levels of from 0 to 255, i.e., image density values), and the output of the A/D converter 202 is input to a sampling circuit 203 where the effective image period of the above-described video signal for one line (1 scan) is divided into 512. As a result, each picture frame comprises a data matrix comprising 481 rows and 512 columns (see FIG. 3), and this data is transferred to an image memory 205 through a DMA circuit 204.

A CPU 206 reads out the data from the image memory 205 and executes image processing. The data for the image processing is temporarily stored either in an internal memory of the CPU 206 or in an external working memory (not shown). In FIG. 2, reference numeral 207 denotes a CRT display, and 208 a keyboard.

Figure 1A:
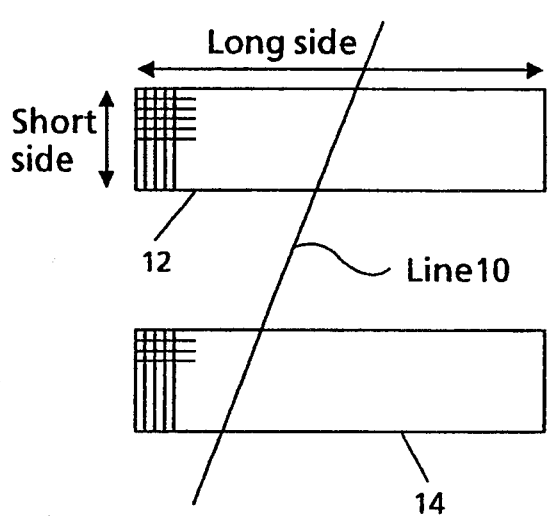
FIGS. 1A to 1E illustrate one embodiment of the present invention.

With the described apparatus employed, one embodiment of the present invention will be explained below in the processing sequence:

(a) The operator sets on the CRT display two parallel rectangular windows 12 and 14 that cross a line 10 as an object of detection along their long sides, as shown in FIG. 1A. The lengths of the long sides of the first and second rectangular windows 12 and 14 are set so that line 10 lies within the set lengths, whereas the lengths of the short sides are each set to several tens of pixels with a view to finding a good balance between the required reliability of the detection and the length of the processing time. In FIG. 1A, the number of pixels constituting each short side is set to 5 for facilitating understanding.

(b) After the rectangular windows 12 and 14 are set in this way, the CPU adds image density values in each of the pixel rows in the direction of the short sides of the rectangular windows 12 and 14 to obtain add data $$\sum_{K=1}^{n} D_k$$

Figure 1B:
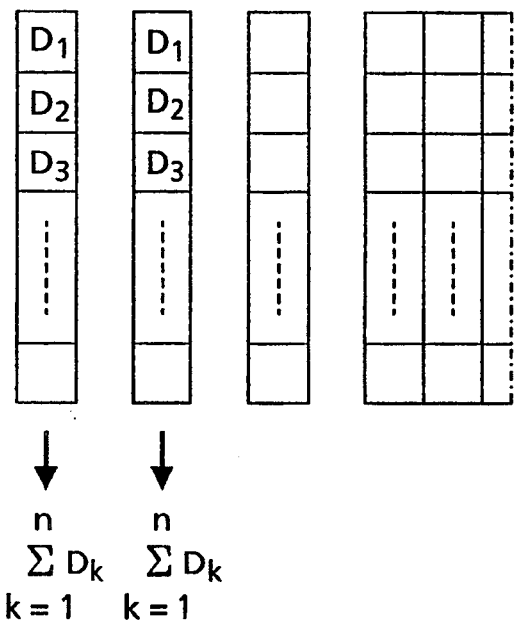

(see FIG. 1B).

Accordingly, this add data is one-dimensional data. This data is temporarily stored either in the internal memory of the CPU or in the external working memory (not shown).

Figure 4:
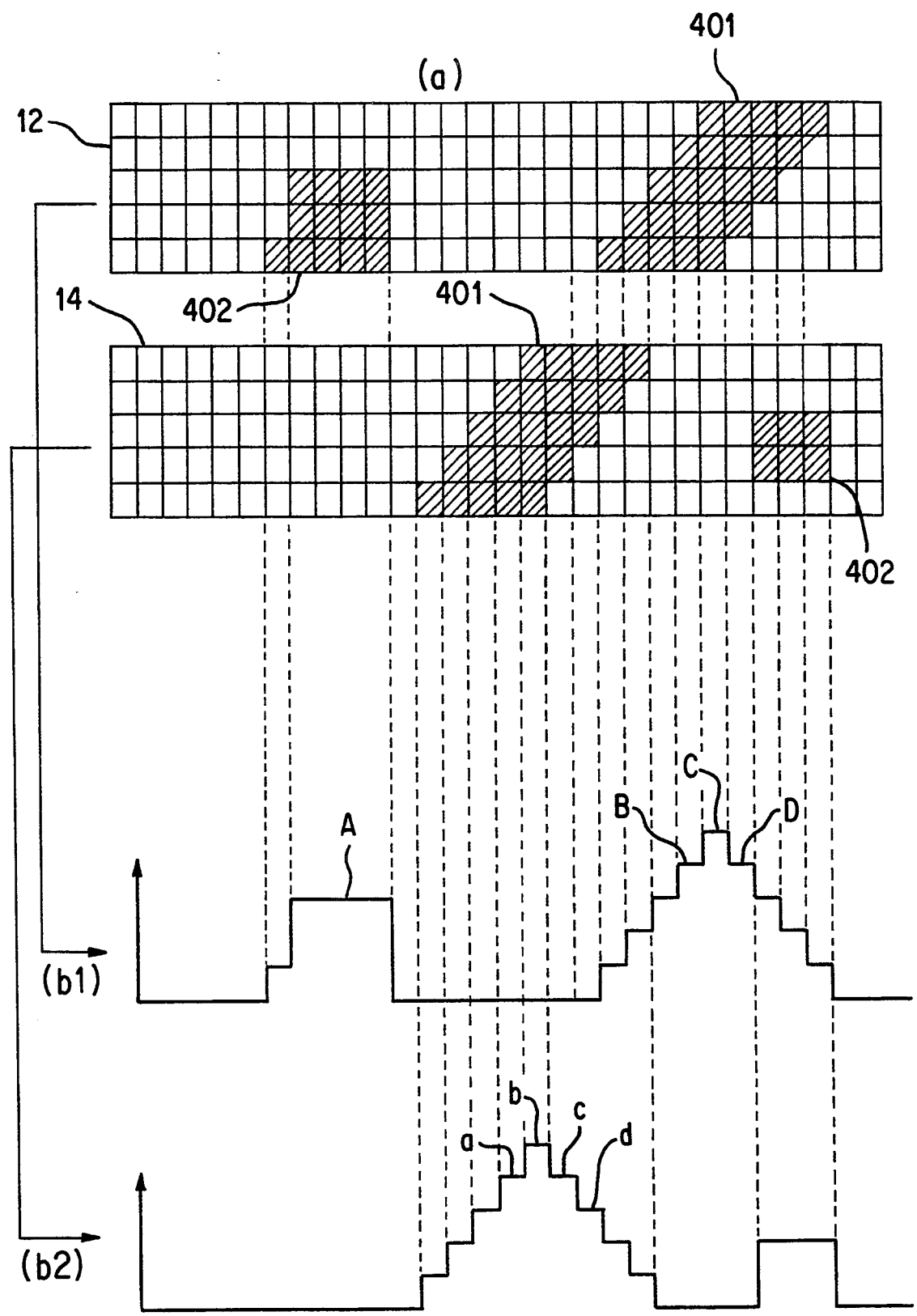
FIG. 4 illustrates line recognition according to the present invention.

FIG. 4(a) shows an image of a line 401 as an object of detection and dust particles or flaws 402, FIG. 4(b1) shows one-dimensional data in the first rectangular window 12, and FIG. 4(b) shows one-dimensional data in the second rectangular window 14.

(c) At least one feature point of the one-dimensional data in the first rectangular window 12 is found. In this embodiment, among the one-dimensional data, four values, that is, the largest value and the second, third and fourth largest values, are found. Reference symbols A to D in FIG. 4(b1) show the four values. Similarly, four feature points in the second rectangular window 14 are found. Reference symbols a to d in FIG. 4(b2) show the four feature points.

(d) Next, the feature points A to D in the first rectangular window 12 and the feature points a to d in the second rectangular window 14 are combined with each other, and a combination that has the maximum value as the sum is obtained. That is, among 15 combinations, i.e., A-a, A-b, A-c, A-d, B-a, B-b, . . . , D-d, a combination that has the maximum value is selected.

In the example shown in FIGS. 4(b1) and 4(b2), the combination of C and b is the largest. In other words, the line that passes through the points C and b is recognized as the line to be detected.

As to the way of obtaining feature points, although in this embodiment a simple size comparison is made, the following methods may also be employed depending upon the characteristics of the object of detection:

(i) For each one-dimensional data, the absolute value of a difference is obtained for every two pixels which are apart from each other by a predetermined number of pixels, and a position that takes a maximum absolute value of the difference is defined as a feature point.

(ii) For each one-dimensional data, the absolute value of a difference is obtained for every two pixels which are apart from each other by a predetermined number of pixels, and only when the absolute value of the difference value changes in the sequence: large→small→large, or small→large→small, the difference value is obtained, and a position where the difference value reaches a maximum is defined as a feature point Although there are other methods that utilizes a standard deviation of one-dimensional data, description thereof is herein omitted for avoiding complication.

The reason why a difference is obtained every predetermined number of pixels is as follows: When the input image is unclear, if a difference between a pair of adjacent pixels is obtained, the difference is inadequately small. Therefore, a difference between two pixels which are apart from each other by some pixels is obtained. The number of pixels which are skipped over is set according to the degree of clearness of the image.

(e) The sum of the characteristic values of the combination and the inclination thereof are stored in memory.

Figure 1C:
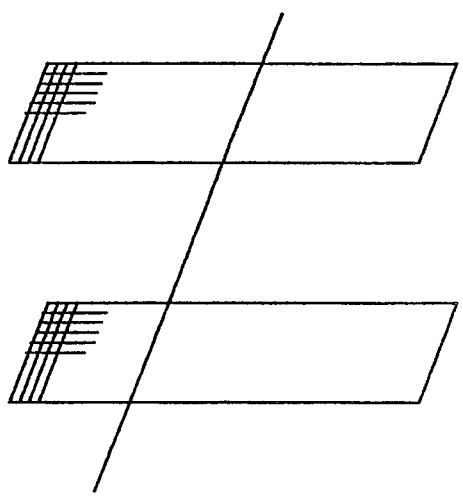
Figure 1D:
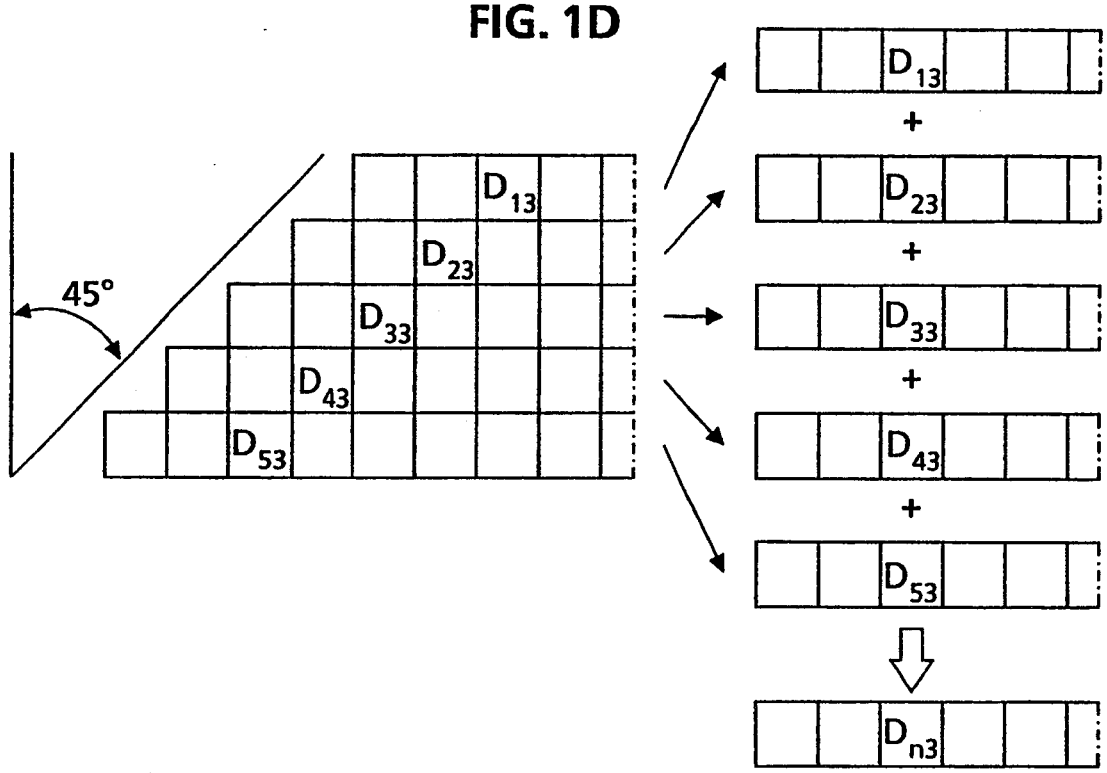
Figure 1E:
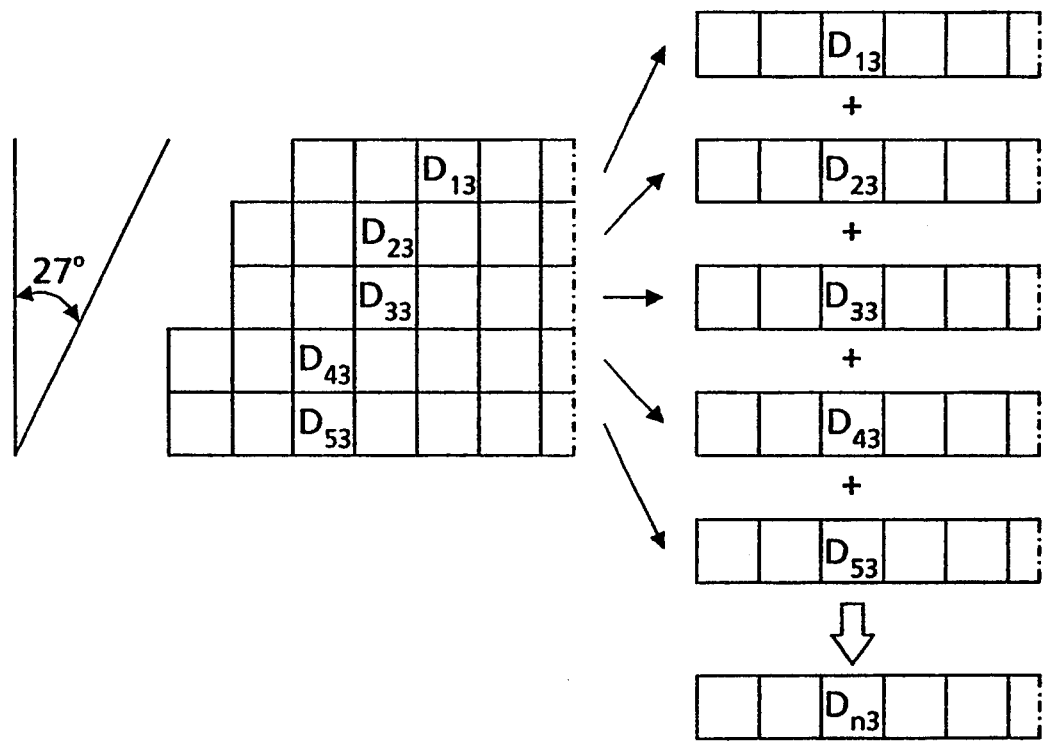

(f) Each of the rectangular windows is inclined along the inclination so that the short sides are parallel to the direction of the inclination, thereby forming a parallelogram-shaped window (FIG. 1C). In this case, since the pixel matrix itself, shown in FIG. 3, cannot be deformed, data of pixels which are to be fetched must be determined. FIG. 1D shows an example in which the angle of inclination is 45 degrees, and FIG. 1E shows an example in which the angle of inclination is 27 degrees.

(g) The processing steps (b) to (e) are executed in regard to the parallelogram-shaped windows, thereby storing the inclination and the value of the sum.

It should be noted that, although the step (g) is necessary when a higher degree of accuracy is desired, it may be omitted for a simple processing.

The foregoing is the processing in the preparatory stage, which is preparation needed to enter into an actual operation. In particular, when the present invention is applied to an image processing for an industrial robot, this operation is executed with a test sample at the time of teaching the robot.

The following is a processing in the detecting stage.

(h) With regard to the parallelogram-shaped windows obtained in the preparatory stage, the processing steps (b) to (e) are executed, and the inclination and the value of the sum of characteristic values, thus obtained, are compared with those obtained in the preparatory stage, thereby detecting the position of the line to be obtained.

By execution of the above-described method, in which image density values are added in the direction of the short sides of the windows, the density feature of the portion 401 corresponding to the line to be detected is emphasized more than that of the stain, dust or the like 402 which has a short length in the direction of the short sides.

As has been described above, the present invention enables image processing to be executed with high accuracy even in industrial sites of, for example, a welding operation, an operation of assembling large-sized machinery, etc., where the input image signal is not stable due to a stain on the object or inferior surroundings.

In addition, even in a working area where it has heretofore been impossible to introduce a robot because no good image can be obtained, a robot with a visual sense capability can be introduced by use of this image processing. Therefore, the present invention will make a great contribution to saving of labor.

The present invention can be utilized for image processing, for example, in a welding robot that performs welding while monitoring the weld line.

We claim:

1. A method of detecting a position of a rectilinear object of detection by image processing using an imaging device, comprising the steps of:

performing prepatory steps, with respect to a standard sample, of:
- (a) setting two parallel rectangular windows having long sides extending in a long side direction and short sides extending in a short side direction, such that said long sides cross a line to be detected;
- (b) adding image density values in each pixel column extending in the short side direction of said rectangular windows to obtain one-dimensional data comprising a row of resulting add values for each rectangular window, with each add value corresponding to one said pixel column;
- (c) obtaining at least one feature point for each of said one-dimensional data, each said feature point having a characteristic value based on one of size, gradient and change in gradient, of said one-dimensional data;
- (d) combining all characteristic values at all feature points in one of said one-dimensional data with all characteristic values at all feature points in the other said one-dimensional data, and obtaining a combination that has a maximum value of a sum of said characteristic values;
- (e) storing in memory the inclination of a line connecting the two feature points that show said maximum value, together with the value of said sum;
- (f) inclining each of said rectangular windows so that the short sides thereof are parallel to the line connecting said feature points, thereby forming parallelogram-shaped windows;
- (g) executing said steps (b) to (e) by using said parallelogram-shaped windows instead of said two parallel rectangular windows, thereby storing said inclination and the value of said sum; and performing the following final step where a rectilinear object of detection is actually detected:
- (h) executing said step (g) again with respect to said object to be detected, and comparing the inclination and the value of the sum, thus obtained, with those obtained in said preparatory stage, to thereby detect the position of the line to be detected.

2. A method of detecting the position of a rectilinear object of detection by image processing using an imaging device, comprising the steps of:

performing prepatory steps, with respect to a standard sample, of:
- (a) setting two parallel rectangular windows having long sides extending in a long side direction and short sides extending in a short side direction, such that said long sides cross a line to be detected;
- (b) adding image density values in each pixel column extending in the short side direction of said rectangular windows to obtain one-dimensional data comprising a row of resulting add values for each rectangular window, with each add value corresponding to one said pixel column;
- (c) obtaining at least one feature point for each of said one-dimensional data, each said feature point having a characteristic value based on one of size, gradient and change in gradient, of said one-dimensional data;
- (d) combining all characteristic values at all feature points in one of said one-dimensional data with all characteristic values at all feature points in the other said one-dimensional data, and obtaining a combination that has a maximum value of a sum of said characteristic values;
- (e) storing in memory the inclination of a line connecting the two feature points that show said maximum value, together with the value of said sum;
- (f) inclining each of said rectangular windows so that the short sides thereof are parallel to the line connecting said feature points, thereby forming parallelogram-shaped windows; and performing the following final step where a rectilinear object of detection is actually detected:
- (g) executing said steps (b) to (e) by using said parallelogram-shaped windows obtained in said preparatory stage, and comparing the inclination and the value of the sum, thus obtained, with those obtained in said preparatory stage, to thereby detect the position of the line to be detected.

* * * * *